United States Patent
Gisin et al.

[11] Patent Number: 5,852,496
[45] Date of Patent: Dec. 22, 1998

[54] METHOD AND DEVICE FOR MEASURING POLARIZATION DISPERSION OF AN OPTICAL FIBER

[75] Inventors: Nicolas Gisin, Geneva; Karin Julliard, Lausanne, both of Switzerland

[73] Assignee: Universite de Geneve, Geneva, Switzerland

[21] Appl. No.: 812,061

[22] Filed: Feb. 14, 1997

[30] Foreign Application Priority Data

Feb. 16, 1996 [FR] France .................................. 96 02419

[51] Int. Cl.$^6$ ....................................................... G01B 9/02
[52] U.S. Cl. ...................... 356/345; 356/351; 356/73.1; 250/227.27
[58] Field of Search ..................... 356/351, 345, 356/73.1; 250/227.17, 227.19, 227.27

[56] References Cited

U.S. PATENT DOCUMENTS 4,893,931  1/1990  Lefevre et al. ......................... 356/351
5,712,704  1/1998  Martin et al. .......................... 356/351

*Primary Examiner*—Samuel A. Turner
*Attorney, Agent, or Firm*—Davis and Bujold

[57] ABSTRACT

The present invention concerns a method and a device for measuring polarization dispersion of an optical fiber which is particularly useful in telecommunications, and which has a finer resolution of this measurement in comparison to methods and devices known in the art. The device consists of an interferometer (51), a low coherent light source (16), a detector (25) for generating an interferogram, and a module (52) connected in series with the optical fiber to be measured (20), this module comprising a high dispersion birefringent fiber (53) of stable, known polarization, two pairs of fiber bundles (55, 56) for adjusting the polarization controller (54) and for aligning the principal polarization modes of the optical fiber to be measured and the birefringent fiber, and an electronic processor (21) for measuring the separation of the lateral peaks on the interferogram resulting as a function of predetermined adjustments to the polarization controller. The polarization dispersion of the fiber to be measured is deduced by measuring the different separation values.

9 Claims, 3 Drawing Sheets

METHOD AND DEVICE FOR MEASURING POLARIZATION DISPERSION OF AN OPTICAL FIBER

The present invention concerns a method for measuring the polarization dispersion of an optical fiber to be measured by using an interferometer and injecting low coherent light into the optical fiber to be measured, which is coupled at the entry of the interferometer.

It also concerns a device for measuring the polarization dispersion of an optical fiber to be measured, comprising an interferometer, a low coherent light source, and means for generating an interferogram.

Measuring the polarization dispersion of an optical fiber is part of the larger process which consists of qualifying optical fibers, particularly optical fibers used in telecommunications. Polarization dispersion corresponds to the time lapse for propagation between two polarization modes inside a fiber. To ensure optimal data transmission, this lapse should be as short as possible. Because fiber shapes are not uniform, and because of numerous couplings between polarization modes which may exist on a telecommunication line, light propagation is not uniform, and thus a mode which is considered short in relation to another rapid mode at a fiber inlet can become slower or faster in the course of propagation and is not necessarily in the same state relative to the other mode when it is at a fiber outlet.

One known method for measuring optical fiber polarization dispersion consists of using an interferometer, for example, a Michelson type interferometer, comprising a delay line with an adjustable mirror which can vary the course of the optical light path being propagated on this delay line in relation to the optical light path being propagated on another line coupled with the delay line using an optical coupler. This apparatus will be described in more detail with reference to FIG. 1.

To measure polarization dispersion, one end of the fiber to be measured is coupled at the inlet of the interferometer and light is injected at the other end of said fiber, preferably light with a central wave length corresponding to that currently used in telecommunications, probably 1300 and 1550 nanometers.

There is a device known in the art, developed by the Applied Physics Group of the University of Geneva and presently distributed by the company known as GAP-OPTIQUE S.A. under the name "PMD", which consists of an interferometer associated with a signal processing unit and which provides an interferogram, that is, a graph showing the outline of the thresholds of interference, with a vertical axis corresponding to light intensity and a horizontal axis corresponding to the displacement of the mirror that varies the optical path of the delay line. Displacement of the mirror is linked to a light delay period caused by the delay line. The correspondence between mirror displacement and this delay period is a function of light speed. In the case of fibers known as polarization maintenance fibers, this interferogram may have one central peak and two lateral peaks which will be shown in greater detail with reference to FIG. 2.

For significant dispersions, the spread of the lateral peaks is clearly visible, but system resolution is situated around $100.10^{-15}$s, at which value the lateral peaks are so close to the central peak that it becomes impossible to determine a variation in the outline width of the three peaks, which are more or less overlapping. It is precisely from this variation in outline width at the mid level that fiber polarization dispersion is determined according to the known method.

In practice, since fiber quality has improved due to better manufacturing methods, the resolution mentioned above is limited and therefore, it is advantageous for it to be enhanced.

EG&G Fiber Optics has developed a process along these lines which was the subject of a publication in "Proceedings of the 3rd Optical Fiber Measurement Conference, Liège, Belgium, Ed. European Action COST 241, September, 1995" entitled "Measurement of Ultra-Low Polarization Mode Dispersion in Single Mode Optical Fibers by a Technique of PMD Biasing." This method consists of associating with the fiber to be measured, or test fiber, a fiber with relatively high polarization dispersion that is both stable and known, and coupling the two fibers in series at the inlet of a suitable measurement device. Next, the resulting curves are observed, first with only the one additional fiber and then with both fibers associated (additional fiber and test fiber), and the increased size of the lateral peaks is measured. Unfortunately, this method has proven to be difficult or even impossible beyond certain limits, which are precisely those described above. In particular, the increased width of the lateral peaks depends upon the relative orientation of the principal polarization modes of the additional fiber and the test fiber. Without any device for aligning these polarization modes, the measurement is not reliable.

Another approach is used by the company KDD Research and Development Laboratories, and the method has been the subject of a publication in "Electronics Letters" of Feb. 19, 1981, Vol. 17, No. 4, entitled "Polarization Mode Dispersion Measurements in Long Single Mode Fibers." In this method, a birefringent interferometer is used and the birefringent axes are aligned using a half-wave strip. The displacement of the peak of the curve peak is measured. However, this device only measures fibers with linear principal polarization modes. This is the case with polarization maintenance fibers, but not with standard fibers such as those used in optical telecommunications. For all other elements, in particular for standard telecommunications optical fibers, the method described in this document tends to systematically under-evaluate polarization dispersion.

The present invention proposes a response to the needs of the telecommunications industry by essentially reducing the resolution of measurement of polarization dispersion by a factor of ten in relation to known methods.

This goal is achieved by the method of the invention, whereby there are connected in series with the fiber optic to be measured a module comprising a birefringent fiber of high polarization dispersion that is stable and known, and a polarization controller, and in that various predetermined adjustments are effected on said polarization controller, corresponding to various predetermined alignments of the principal polarization modes of the optical fiber to be measured and of the birefringent fiber; and an interferogram is produced for each controller adjustment, and the separation of the lateral peaks on each resulting interferogram is measured in order to deduce the polarization dispersion of the fiber to be measured from the different values.

To improve conditions for injecting polarized light into the optical fiber, a quarter round strip is added between the polarizer and the fiber being tested. Thus, varying the orientation of this strip ensures that the two principal fiber polarization modes are displaced by a similar amplitude. This facilitates detection of lateral peaks and consequently, measurement of their positions.

In a first form of the method, polarization dispersion is deduced by measuring the separation of the lateral peaks when the peaks are successively in two extreme positions, a first position corresponding to a first adjustment of the polarization controller, where they are as close together as possible, and a second position, corresponding to a second position of said polarization controller, where they are as far apart as possible.

In a second form of the method, polarization dispersion can be deduced by extrapolation from statistical data representing measurements performed with random orientations between the principal polarization modes of the optical fiber to be measured and the birefringent fiber, said random orientations corresponding to random adjustments of the polarization controller.

All forms of the method use a polarization controller which allows an incident elliptical or linear polarization state to be transformed into an emergent elliptical or linear polarization state.

According to an advantageous embodiment, the device implementing the method of the invention is characterized by comprising a module connected in series with the optical fiber to be measured, said module comprising a birefringent fiber with high polarization dispersion that is stable and known, and a polarization controller, means for adjusting the polarization controller and aligning the principal polarization modes of the optical fiber to be measured and the birefringent fiber, means for measuring the separation of the lateral peaks on the resulting interferogram as a function of the predetermined adjustment of the polarization controller, and means for deducing the polarization dispersion of the fiber to be measured from the different values of said separation.

In all embodiments of the device, said polarization controller is designed to transform an incident elliptical or linear polarization state into an emergent elliptical or linear polarization state.

In the preferred embodiment of the device, said polarization controller comprises two bundled pairs of optical fibers, each pair of bundles forming the equivalent of a quarter round strip, and said means for adjusting the polarization controller are designed to turn the pairs of bundles around a common axle.

Advantageously, the means for forming the interferogram are designed to measure the separation of the lateral peaks when the peaks are successively in two extreme positions: a first position, corresponding to a first adjustment of the polarization controller, where they are as close together as possible; and a second position, corresponding to a second position of said polarization controller, where they are as far apart as possible.

The invention will be more readily understood with reference to the following description of a preferred embodiment of the device according to the invention, and to the attached drawings, wherein.

Figure 1:
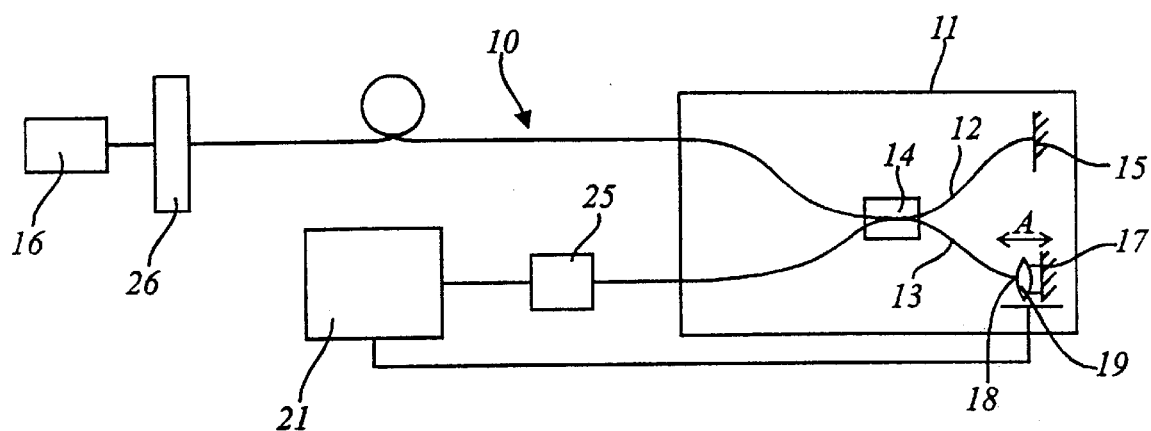
FIG. 1 shows a schematic drawing of a known device for measuring polarization dispersion of an optical fiber.

With reference to FIG. 1, polarization dispersion measurement device 10, such as the device developed by the Applied Physics Group of the University of Geneva and presently distributed by the GAP-OPTIQUE S.A. under the name PMD, comprises an interferometer 11, a light source 16, and a processor 21. Interferometer 11, which may be a Michelson interferometer, essentially contains a coupler 14 for coupling two optical fibers 12 and 13, respectively, and two mirrors, a fixed mirror 15 associated with the end of fiber 12, and a movable mirror 17, movable in the direction of double arrow A, associated with end 18 of fiber 13. This end 18 is also located at the focus of a convergent lens 19 placed in front of mirror 17, which transforms the beam issuing from extremity 18 of fiber 13 into a parallel beam. Light source 16, which is associated with a polarizer 26, may consist of an electro-luminous diode which emits a low coherent light. The spectrum of this light must be smooth and must be about 50 nm wide. This type of light is typically emitted by an electro-luminous diode with a central wave length of from 1300 nm to 1500 nm and typically having a spectrum width of 80 nm.

During measurement of polarization dispersion with this device, the light emitted by source 16 passes through polarizer 26, and is then returned to a fiber to be measured 20, which is in turn connected to optical fiber 12 at the entry to interferometer 11. The light is then split in two in coupler 14. One portion of the light passes through the portion of fiber 12 which terminates at fixed mirror 15, and the other portion of the light traverses the portion of fiber 13 which terminates at movable mirror 17. Both of these light portions are sent back to coupler 14 by the mirrors and then to fiber 13, where they interfere. A detector 25 connected to fiber 13 delivers an electrical signal proportionate to the intensity of the light leaving said fiber. The electrical signal emitted by detector 25 is sent to electronic processor 21, which generates the interferogram that is a function of displacing the movable mirror 17. An example of an interferogram is shown in FIG. 2.

The principle according to which the measurement device functions is based on the fact that, due to geometric irregularities causing grade variations in the fiber, two so-called principal modes of polarization are propagated at various speeds in fiber 20. One of these principal polarization modes is considered "slow" and the other principal polarization mode is considered "rapid."

When adjustable mirror 17 is in a certain position, called position zero, the optical paths of the two fibers 12 and 13 are identical. In this case, the slow mode and the rapid mode in each of fibers 12 and 13 interfere, causing a central peak 30 which is actually the outline of a system of interference thresholds. When mirror 17 is displaced for a length which causes the optical path to extend for a distance of $+\Delta|_1$, the result is a situation where the slow mode, which has traversed fiber 12, interferes with the rapid mode, which has traversed fiber 13. The image observed is a lateral peak 31 which again forms the outline of a system of interference thresholds. Similarly, when mirror 17 is displaced for a length which causes the optical path to vary by $-\Delta|_1$, the opposite situation results, where the rapid mode, which has traversed fiber 12, interferes with the slow mode, which has traversed fiber 13, resulting in a peak 32 which represents the outline of a system of interference thresholds. The polarization dispersion of the fiber to be measured 20 can be deduced from the separation $\Delta|_1$ between lateral peaks 31 and 32 and central peak 30.

Figure 2:
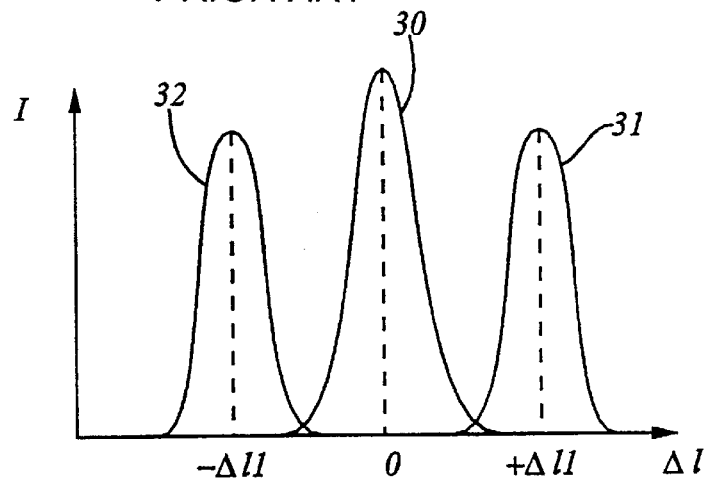
FIG. 2 shows a view of the interferogram obtained using the device of FIG. 1, with a polarization maintenance fiber having a polarization dispersion value above the limit of resolution.

The interferogram shown in FIG. 2 corresponds to fibers called polarization maintenance fibers. In the case of standard fibers, such as those used in telecommunications, the interferogram has one central peak and numerous lateral peaks. However, in the case of standard fibers with very low polarization dispersion, lower than the coherence time of the light used, the lateral peaks are concentrated as one pair of lateral peaks on either side of the central peak. In actuality, if polarization dispersion is lower than the coherence time of the light, the fiber behaves like a bi-modal fiber, and the two polarization modes are called "principal polarization modes." Unlike the polarization maintenance fibers, these principal polarization modes do not generally correspond to linear polarization states, but rather to elliptical polarization states.

Figure 3:
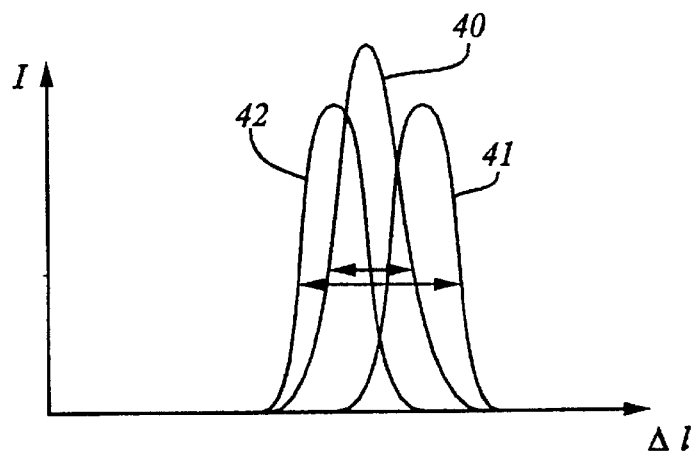
FIG. 3 shows the interferogram obtained with the device of FIG. 1 when approaching the limit of resolution.

FIG. 3 shows the central peak 40 and the lateral peaks 41 and 42 when the resolution limit of the device of FIG. 1 has been reached, that is, $100.10^{-15}$s, which corresponds to displacing mirror 17 approximately $8.10^{-8}$m.

Figure 4:
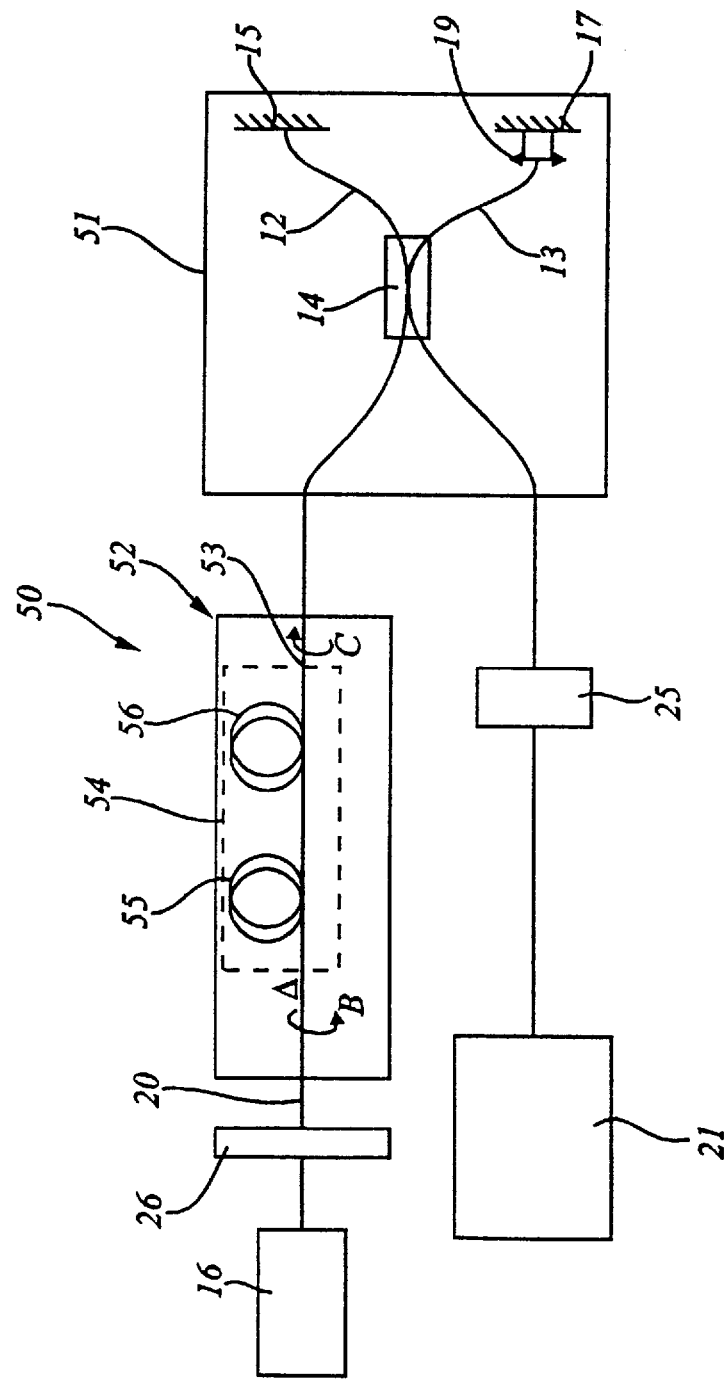
FIG. 4 is a schematic illustration of the polarization dispersion measurement device according to the invention.

FIG. 4 shows a schematic view of device 50 according to the invention, comprising an interferometer 51, identical to interferometer 11 described previously, and comprising optical fibers 12 and 13, coupler 14, fixed mirror 15, movable mirror 17, and convergent lens 19. As before, a light source 16 associated with a polarizer 26 sends light into a fiber 20 to be measured, but in this embodiment, a module 52 is attached in series to the fiber 20 to be measured and interferometer 51. This module comprises a length of polarization maintenance fiber 53 with a known, relatively high polarization dispersion, which is birefringent, stable, and not connected to modes, and a polarization controller 54. The polarization controller 54 is a device that can transform any incident elliptical or linear polarization state into any emergent elliptical or linear polarization state. Such a polarization controller can be obtained by forming two pairs of fiber bundles 55 and 56, the diameter of the bundles depending upon the wave length of the light and the type of fiber. By turning these bundles in the opposite direction, according to arrows B and C, around the axis Δ defined by the fiber, the constraints caused by the curve allow any polarization state to be reached. The result is a sort of polarization sweep. As with device 10, this device has a signal detector 25 and an electronic processor 21.

Thus, by turning the two pairs of bundles around a common axis, this device permits any incident polarization state, elliptical as well as linear, to be transformed into any emergent polarization state. This is necessary because the principal polarization states of standard fibers, such as those used in telecommunications, do not generally correspond to linear polarization states, but rather to elliptical polarization states.

Figure 5A:
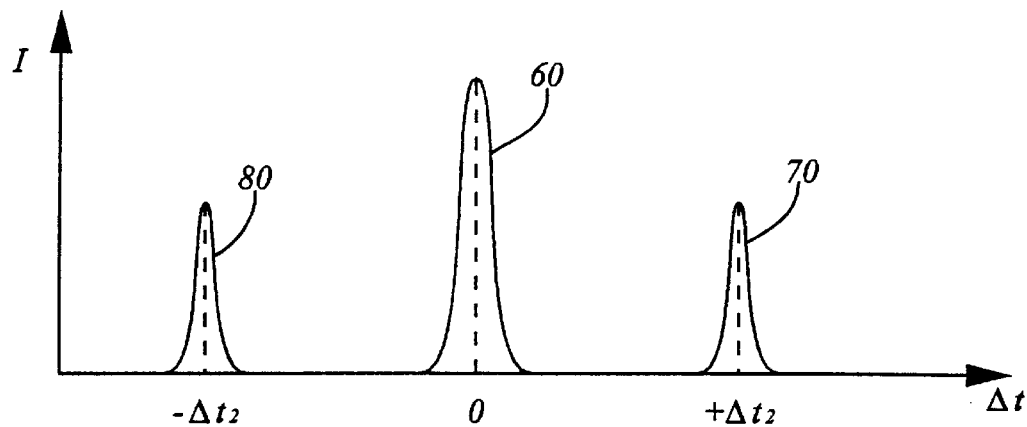
FIGS. 5a to 5d show several interferograms obtained using the device of the invention.

FIG. 5a shows the interferogram obtained using the device shown in FIG. 4 when a measurement is performed without fiber 20. The separation between lateral peaks 70 and 80 corresponds to the polarization dispersion of birefringent fiber 53.

Figure 5B:
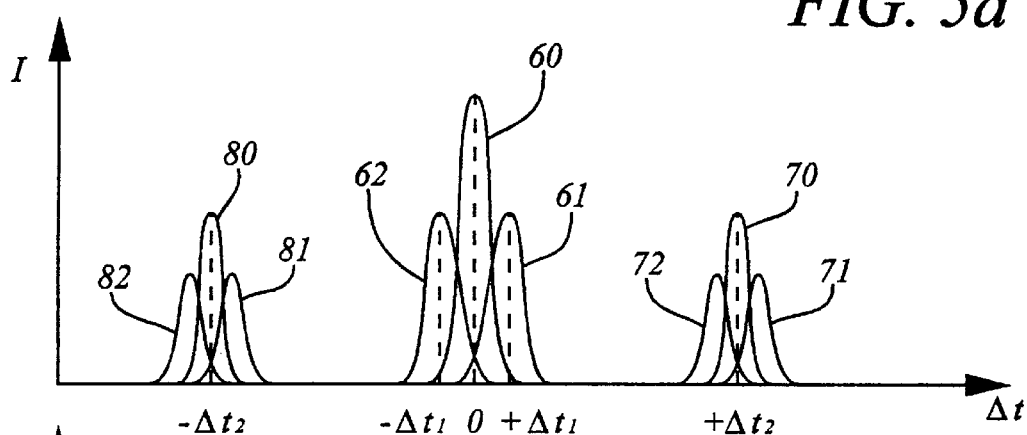

FIG. 5b shows one of the interferograms which can be obtained using the device of FIG. 4 when fiber 20 is included, and polarization controller 54 is adjusted so that the principal polarization modes of optical fiber 20 to be measured and birefringent fiber 53 are not aligned. In this interferogram, the propagation delay in the two modes corresponding to the different polarization states induced by polarization dispersion in fiber 20 to be measured is $\Delta t_1$, and the delay induced in the birefringent fiber 53 with strong polarization dispersion is $\Delta t_2$.

At the outlet of fiber 20, the light is decomposed into the two principal modes of fiber 20, called $L_1$ and $R_1$, corresponding respectively to the slow and rapid modes of this fiber. These two portions of light are separated by a time interval $Dt_1$. During passage of birefringent fiber 53, each of the two portions mentioned above is again divided in two, one being propagated according to the slow mode of fiber 53, and the other according to the rapid mode of fiber 53. At the outlet of fiber 53, the light is thus formed of four portions called $L_1L_2$, $R_1L_2$, $L_1R_2$, and $R_1R_2$, which correspond respectively to the portion of light being slowly propagated into fiber 20 and slowly into fiber 53, rapidly into fiber 20 and slowly into fiber 53, slowly into fiber 20 and rapidly into fiber 53, rapidly into fiber 20 and rapidly into fiber 53.

For a null delay, coincidence will occur between modes $L_1L_2$, $R_1L_2$, $L_1R_2$ and $R_1R_2$ and between rapid modes $R_1R_2$ (in fibers 20 and 53, respectively) when they are propagated in the two fibers 12 and 13 in the interferometer. This situation corresponds to central peak 60 on the resulting interferogram.

Lateral peak 61 corresponds to the coincidence of mode $L_1L_2$ having traversed fiber 12 with mode $R_1L_2$ having traversed fiber 13, as well as to the coincidence between modes $L_1R_2$ and $R_1R_2$ having traversed fibers 12 and 13, respectively.

For lateral peak 62, the separation is inverse in relation to that which results in lateral peak 61.

Central peak 70 is due to the interference of modes $L_1L_2$ having traversed fiber 12 with modes $L_1R_2$ and $R_1R_2$ having traversed fiber 13. Lateral peak 71 is due to the interference of mode $L_1L_2$ having traversed fiber 12 with mode $R_1R_2$ having traversed fiber 13. Likewise, a second lateral peak 72, symmetrical to lateral peak 71 in relation to central peak 70, is obtained.

The same effects produce a central peak 80 associated with two lateral peaks 81 and 82, but the separations are reversed.

Figure 5C:
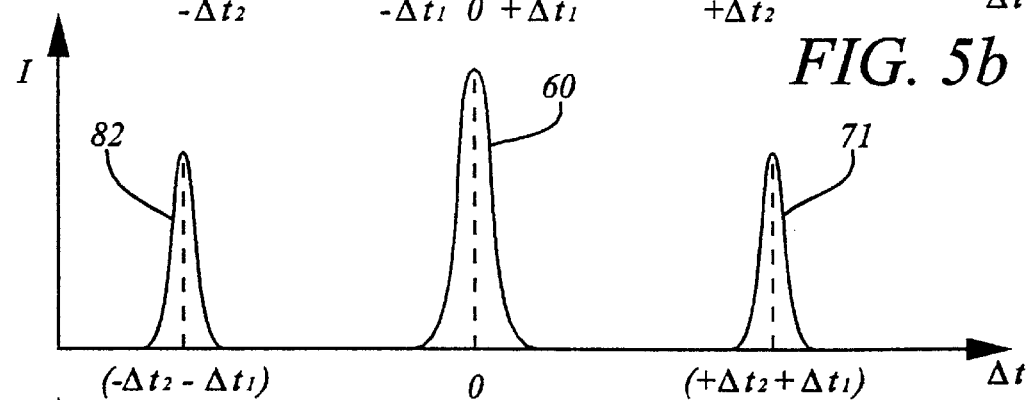

FIG. 5c shows the interferogram obtained with the device of FIG. 4 when fiber 20 is included and polarization controller 54 is adjusted so that the principal polarization modes of the optical fiber 20 to be measured and the birefringent fiber 53 are aligned. The polarization controller ensures alignment of fibers 20 and 53. Note that with polarization maintenance fibers, the principal polarization modes are not distinct from its birefringent axes. Naturally, this is not the case with standard fibers, given that they have no birefringent axes, since they fluctuate along the fibers. For a given polarization, polarization dispersion corresponds to a value $\Delta t_1 + \Delta t_2$. Since $\Delta t_2$ is known, $\Delta t_1$ can be calculated.

FIG. 5c represents the interferogram obtained with the device of FIG. 4 when fiber 20 is included and polarization controller 54 is adjusted so that the two principal polarization modes of the optical fiber 20 to be measured and the birefringent fiber 53 are aligned. By correctly orienting bundles 55 and 56 of polarization controller 54, the state being rapidly propagated into fiber 20 can be transformed into the rapid polarization state of birefringent fiber 53, and, reciprocally, the state being slowly propagated into fiber 20 can be transformed into the slow polarization state of fiber 53. Thus, peaks 61, 62, 70, 72, 80 and 81 disappear. Only left peak 82, central peak 60 and right peak 71 remain.

Figure 5D:
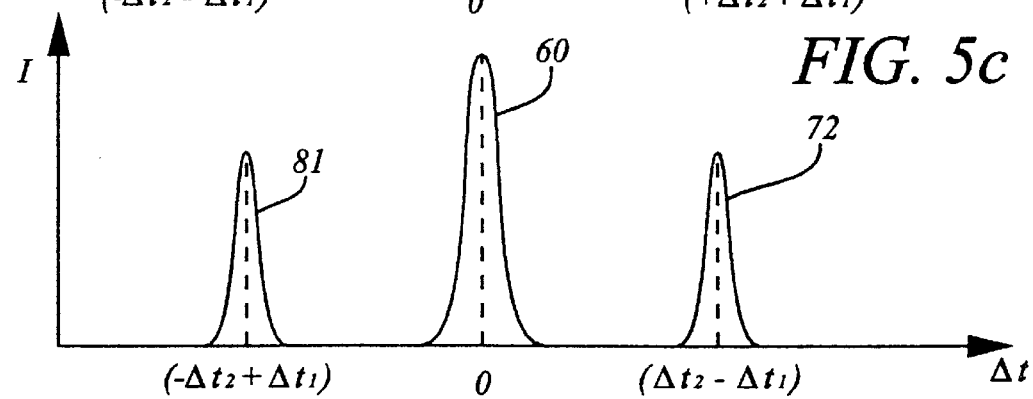

FIG. 5d shows the interferogram obtained with the device of FIG. 4 when fiber 20 is included and polarization controller 54 is adjusted so the principal polarization modes of optical fiber 20 to be measured and birefringent fiber 53 are aligned in crossed arrangement. Changing the orientation of bundles 55 and 56 of the polarization controller so as to transform the state being rapidly propagated in fiber 20 into the slow polarization state of birefringent fiber 53 and, reciprocally, changing the state being slowly propagated in fiber 20 into the rapid polarization state of fiber 53, causes peaks 61, 62, 70, 71, 80 and 82 disappear. Only left peak 81, central peak 60 and right peak 72 remain.

The two adjustments described above thus reveal the displacement of the maximum position of the left and right lateral peaks. This displacement, corresponding to the separation between peaks 82 and 81, as well as between peaks 72 and 71, corresponds to delay $2(\Delta t_1)$.

An alternative for measuring the size $\Delta t_1$ consists of performing a first measurement without fiber 20 in order to obtain an interferogram corresponding to only the birefringent fiber, that is, peak 80, central peak 60 and peak 70, and then performing a second measurement after adding fiber 20 and with bundles 55 and 56 of the polarization controller properly oriented, in order to transfer the state being rapidly propagated in fiber 20 into the rapid polarization state of birefringent fiber 53 and reciprocally, the state being slowly propagated in fiber 20 into the slow polarization state of fiber 53. The interferogram of this second measurement will then consist of peak 82, central peak 60 and peak 71.

The displacement of the lateral peaks during measurement, corresponding to the separation between peaks 82 and 80 and between peaks 70 and 71c, corresponds to delay $\Delta t_1$.

This method improves measurement sensitivity, as the resolution of the device is less than $10.10^{-15}$s, since it is more precise to measure the maximum displacement of a packet than its increased width.

The polarization controller is necessary to achieve this, because it allows any polarization, for example, an elliptical polarization, to be transformed into a linear polarization. Telecommunications fibers generally have principal polarization modes that are elliptical, and a birefringent fiber has linear polarizations.

To accelerate measurement, it is not necessary to align the principal polarization modes of fibers 20 and 53 exactly, but only to deduce the polarization dispersion $\Delta t_1$ from a statistical unit of measurements performed on random orientations between the principal polarization modes of fibers 20 and 53. This will typically result in several dozen measurements with random polarization controller positions.

The device according to the invention is based on a much simpler interferometer, since it does not include an element acting on polarization within the interferometer, and it also offers improved stability, as optical fibers are used at the core of the interferometer. Moreover, the use of one fiber HiBi in front of the interferometer doubles the instrument's sensitivity.

We claim:

1. A method for measuring a polarization dispersion of an optical fiber to be measured by coupling the optical fiber to be measured to an interferometer and injecting, via a light source, a low coherent light into said optical fiber to be measured, said method comprising the steps of:

connecting a module in series with said optical fiber to be measured, at a location between said optical fiber to be measured and the interferometer, said module having a birefringent fiber, with a stable and known high polarization dispersion, and a polarization controller;

performing various predetermined adjustments, via said polarization controller, corresponding to different predetermined alignments of principal polarization modes of the optical fiber to be measured and the birefringent fiber;

obtaining an interferogram for each polarization controller adjustment by measuring a separation between lateral peaks of each interferogram; and deducing a polarization dispersion of the fiber to be measured from the measured separation between lateral peaks of each interferogram.

2. A method according to claim 1, further comprising the steps of calculating said polarization dispersion by measuring the separation of the lateral peaks when said peaks are successively in two extreme positions, with a first extreme position corresponding to a first adjustment of the polarization controller in which the lateral peaks are as close together as possible, and a second extreme position corresponding to a second adjustment of said polarization controller in which the lateral peaks are as far apart as possible.

3. A method according to claim 1, further comprising the steps of calculating said polarization dispersion by extrapolating from a statistical unit representing measurements performed with random orientations between the principal polarization modes of the optical fiber to be measured and the birefringent fiber, where said random orientations correspond to random adjustments of the polarization controller.

4. A method according to claim 1, further comprising the steps of transforming, via said polarization control, an incident polarization state into an emergent polarization state.

5. A device for measuring the polarization dispersion of an optical fiber to be measured, said device comprising:

a low coherent light source (16) for communicating with an optical fiber to be measured and injecting light into the optical fiber to be measured;

an interferometer (51);

means, coupled to said interferometer (51), for generating an interferogram from the light supplied to the optical fiber to be measured; and a module (52) being connected in series with said optical fiber to be measured (20) at a location between the optical fiber to be measured and the interferometer (51), said module having a birefringent fiber (53) with a stable and known high polarization dispersion and a polarization controller (54) for adjusting a separation between lateral peaks of the measured interferograms and determining the polarization dispersion from the separation between the lateral peaks.

6. A device according to claim 5, wherein said polarization controller (54) has a mechanism for transforming an incident polarization state into an emergent polarization state.

7. A device according to claim 6, wherein said polarization controller (54) comprises two pairs of bundles of optical fibers (55, 56), and each pair of bundles forms an equivalent of a quarter round strip.

8. A device according to claim 5, wherein the polarization controller (54) has means for adjusting two pairs of bundles of optical fibers (55, 56) about a common axis.

9. A device according to claim 5, wherein the means for generating the interferogram measures the separation of the lateral peaks when the lateral peaks are successively in two extreme positions, a first extreme position corresponding to a first adjustment of the polarization controller in which the lateral peaks are as close together as possible, and a second extreme position corresponding to a second adjustment of said polarization controller in which the lateral peaks are as far apart as possible.

* * * * *